Aug. 18, 1964   S. T. KNOTT ETAL   3,144,848
LIGHTWEIGHT TOWED TRANSDUCER HOUSING
Filed April 16, 1963   3 Sheets-Sheet 3

Sydney T. Knott
Warren E. Witzell
INVENTORS

BY *[signature]*

Attorney

United States Patent Office 3,144,848
Patented Aug. 18, 1964

3,144,848
LIGHTWEIGHT TOWED TRANSDUCER HOUSING
Sydney T. Knott, Barnstable, and Warren E. Witzell, Woods Hole, Mass., assignors to the United States of America as represented by the Secretary of the Navy
Filed Apr. 16, 1963, Ser. No. 273,537
4 Claims. (Cl. 114—235)

The present invention relates generally to oceanographic equipment and, more particularly, to a lightweight, dynamically stable, towed vehicle for accommodating sound generating and/or detecting apparatus.

In heavy weather and at relatively high speeds, hull-mounted sound generating and/or detecting devices lose their effectiveness because their acoustical signals are obscured by surface and self-generated noise. Towed enclosures, commonly called "fish," have, therefore, been developed to maintain this equipment in a remote, unperturbed, acoustical environment that is deep enough to avoid quenching difficulties in rough seas and at relatively light towing speeds.

Besides maintaining the sound apparatus in a satisfactory acoustical environment, these vehicles usually must hold the sonar in a particular attitude, especially where, for example, the transducer has directional characteristics. Adjustable trimming fins or other control surfaces have usually been relied upon for achieving this dynamic stability. Also, gimbals or other types of spatial orientational mechanisms have been built into the vehicle to solve this problem. However, these attitude control devices not only increase the weight and size of the over-all gear and make the streaming towing and recovery operations from small vessels hazardous, but they also increase the self-generated noise characteristic of the equipment.

It is accordingly a primary object of the present invention to provide a compact, lightweight, dynamically stable, towed vehicle for sound generating and/or detecting apparatus.

A secondary object of the present invention is to provide a towed echo-sounder transducer enclosure having a low self-generated noise characteristic.

Another object of the present invention is to provide a towed vehicle for echo-ranging apparatus which maintains the apparatus in a horizontal attitude over a wide range of speeds.

A still further object of the present invention is to provide a towed vehicle for acoustical equipment which can be handled easily from small vessels.

A yet still further object of the present invention is to provide a towed housing for a sound transducer which maintains the transducer beam axis in a vertical attitude over a wide range of towing speeds.

Other objects, advantages and novel features of the invention will become apparent from the following detailed description of the invention when considered in conjunction with the accompanying drawings wherein.

Figure 1:
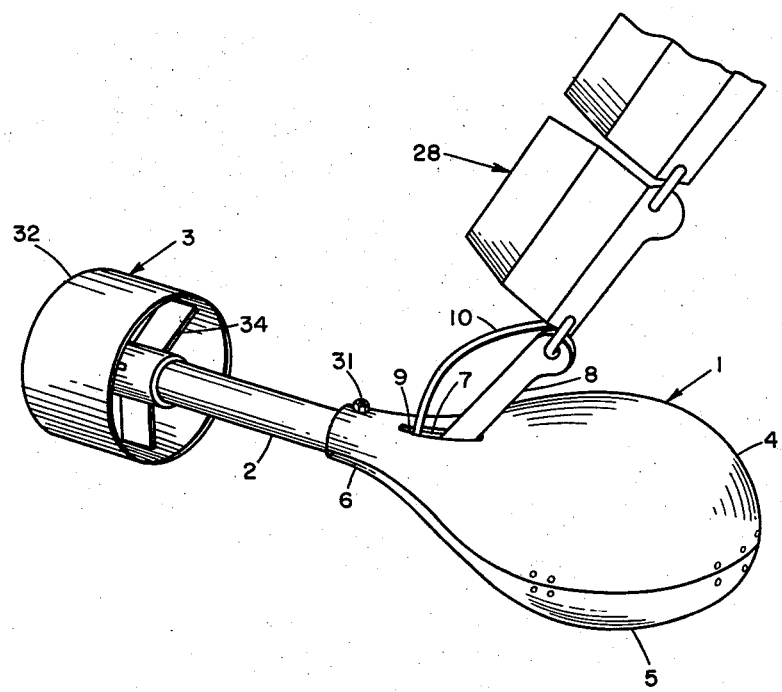
FIG. 1 illustrates the vehicle in its proper towing attitude.

Referring now to FIG. 1 of the drawings, the towed vehicle of the present invention, in one preferred embodiment, is seen to consist of three major subassemblies: a generally "teardrop" shaped housing 1, a tail pipe 2 attached thereto, and an adjustable, cylindrical ring tail 3. Housing 1, which may be a lightweight, molded laminate of fiber glass and polyesterin, divides into symmetrical upper and lower half shells 4 and 5, respectively. Formed in upper shell 4, along its vertical plane of symmetry and adjacent to the semi-cylindrical, rear collar portion 6 thereof, is a fore and aft slot 7 through which the towing strain member 8 passes. This slot, which gives the vehicle a free-flooding characteristic, tapers at its rear portion to a reduced diameter length 9 into which the electrical supply cable 10 for the acoustic sound generating and detecting apparatus snaps once the towing operation commences and the forces on this cable build up.

Figure 2:
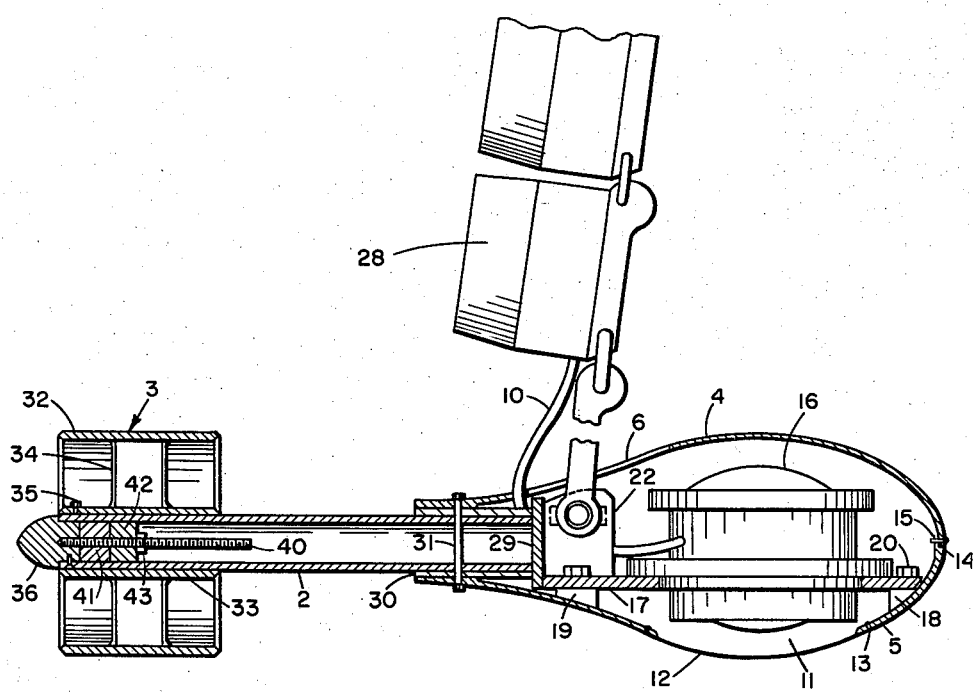
FIG. 2 is a cross section of the towed vehicle showing the internal details thereof.

As perhaps best shown in FIG. 2, lower half shell 5 has an aperture 11 formed in its lowest portion which is covered by a stainless steel, circular, acoustic window 12 held in place by a multiplicity of bolts, such as 13. This window is transparent to sonic energy and, consequently, provides a low attenuation path for the sound signals emanating and arriving at the sound equipment accommodated within housing 1. The size of this window and the aperture it covers should, of course, be approximately equal to the active surface of the sound equipment.

Lower half shell 5 also has its complete rim formed with a cutout portion 14 which accepts the rim of upper shell 4. A multiplicity of bolts, such as 15, passing through these rims and suitably spaced around upper shell 4 hold both halves of housing 1 together.

Figure 3:
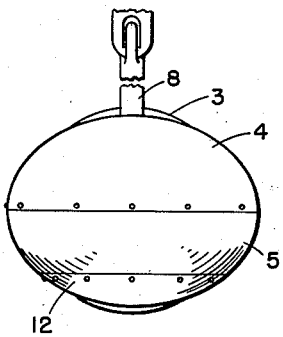
FIG. 3 is a "head on" view of the vehicle showing its generally elliptical cross-sectional shape at its point of maximum width.

FIG. 3, which is a "head on" view of the assembled apparatus, perhaps best illustrates the symmetrical construction of the upper and lower half shells 4 and 5 and additionally shows that the housing diverges from its nose until at its point of maximum width it has an elliptical cross-sectional shape. Thereafter, as perhaps best shown in FIG. 1, it converges so that it has a circular, cross-sectional shape at its rear end.

Figure 4:
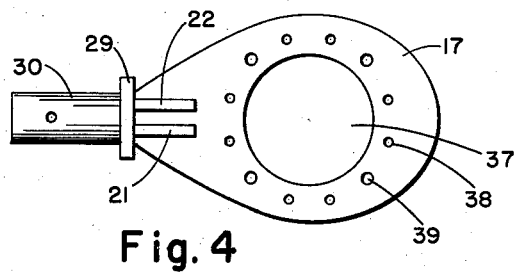
FIG. 4 shows the details of the transducer mounting plate.

The sound generating and detecting apparatus represented by transducer 16 in FIG. 2 is secured to a transducer mounting plate 17 via suitable bolts, not shown, and this plate rests on and in turn is secured by bolts 20 to a series of base supports such as 18 and 19 molded into lower shell 5. The configuration of this mounting plate is illustrated in FIG. 4 and from an examination of this figure it will be seen that this mounting plate has a shape which matches the inside contour of lower shell 5. Apertures 38 and 39 cut in the rim portion of this plate are for anchoring it to shell 5 and for mounting the transducer. Also, a relatively large central aperture is formed therein through which projects, as best seen in FIG. 2, the lower sound sensitive face of transducer 16.

Figure 5:
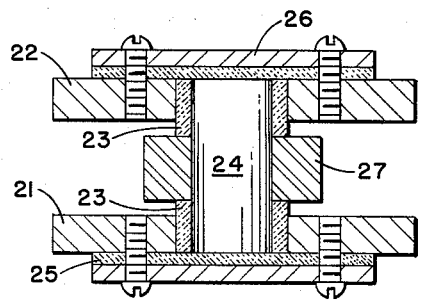
FIG. 5 depicts the details of the towing point assembly.

Attached to mounting plate 17, such as by welding, are a pair of upright, parallelly spaced plates 21 and 22 and, as best shown in FIG. 5, these plates are journaled to accept a bearing 23 for a towing pin 24. The side thrust of this pin is limited by a pair of pads 25 attached to opposite sides of these plates by retaining members 26. Fitting over pin 24 and capable of rotation thereabout is a stainless steel ring 27 which serves as the point of attachment of the towing strain member 8. This strain member may, for example, be the first link of a faired articulated towing member 28, and ring 27 may be an integral portion thereof. For quiet and smooth operation, bearings 23 and pads 25 preferably should be made of Teflon. By utilizing Teflon construction, both the towed vehicle and the acoustical apparatus housed therein are partially isolated from vibrations developed or transmitted by towing chain 28.

In order to provide a convenient point of attachment for the tail subassembly, a circular end plate 29, as shown in FIG. 4, is welded or otherwise secured to the back of the two vertical plates 21 and 22. This structural member assists in keeping these plates properly spaced during the towing operation and, additionally, it serves as a base for a cylindrical tail socket 30 affixed thereto. Tail-pipe 2, as shown in FIG. 2, intimately fits within this socket with its forward end abutting plate 29 and is locked in position by bolt 31 which also passes through both rear collar portions of upper and lower shells 4 and 5. This bolt, it will be appreciated, complements rim bolts 15 in holding housing 1 together.

The remote end of tail pipe 2 carries an adjustable ring tail 3. This tail, whose diameter is substantially equal to the maximum height of housing 1, is made up of an outer sleeve 32 and an inner sleeve 33 held together by three spacers, such as 34, disposed 120° apart with respect to the central axis of this assembly. Ring tail 3 is adapted to move along tail pipe 2 and, thus, this member can be set at different locations with respect to the towing point of the vehicle. Once positioned, it can be locked in place by set screws 35. To assist in the dynamic balancing of the complete vehicle with transducer 16 in place, a streamline tail piece 36 is fitted into the opened end of tail pipe 2 and fastened by bolts passing through the wall portion of this pipe. Tail piece 36 also supports a threaded rod 40 which carries one or more annular weights 41 and 42 for assisting in the balancing operation. These weights are locked in place by a suitable nut 43.

The weight and drag of the above vessel, as is well known, determine in part its tow depth at any particular speed. By locating the towing point, which may be considered as the center of ring 27, as near as practical to the center of resistance along the towing axis, the "fish" does not tend, due to its drag, to pivot around this point and assume different angles of attack. The above towing point, moreover, is located as near as practical to the center of fore-and-aft righting moments due to water resistance in the vertical axis and, also, over the center of gravity in water. Thus, vertical motion through the water has less tendency to cause pitching. The roll of the vehicle is primarily controlled by keeping its center of gravity in water below the tow point, while its yaw is controlled by the cylindrical ring tail whose water resistive moment in the horizontal plane is greater than the lateral resistive moment of the transducer enclosure forward of the tow point. It would be pointed out that one important feature of ring tail 3 is its symmetrical resistance to flow at any particular solid angle to the fore-and-aft centerline.

The assembly of the vehicle is quite simple. First, transducer mounting plate 17, with the tow point subassembly elements affixed thereto, is placed upon and fastened to bottom shell 5. Next, transducer 16 is secured to the mounting plate. Then, top shell 4 is fastened to bottom shell 5 and the tail pipe subassembly locked in place.

The required balancing of the vehicle may be accomplished in the field by the following procedure: The ring tail is positioned by trial when balancing for dynamic effects of rapid vertical movement through the water. This is checked by rapidly hoisting and lowering the vehicle. Tests have shown that tail 3 should be about five inches from the end of the tail pipe and, generally, small weights are needed to maintain the balance of buoyancy moments. As indicated hereinbefore, weights added aft of the towing point may be accommodated within tail pipe 2 on threaded rod 40. Weights required forward may simply be bolted to the transducer mounting plate 17. It has been experimentally determined that the flow characteristics of the housing permits the ring tail to be positioned up to twelve inches from the end of the tail pipe without causing yawing problems.

In one practical embodiment of the present invention, the total weight in air of the vehicle with a UQN-1 transducer was approximately 270 lbs. Its maximum width was 15 in., its height 12¾ in., and its length 53 in. The housing was a ¼-in. thick molded-laminate of fiber glass and polyester resin.

Because of its fiber glass and steel construction, the towed transducer vehicle of the present invention requires a minimum of maintenance. Also, its self-generated noise level is sufficiently low to permit towing in excess of fifteen knots. In sea states of seven or more, satisfactory performance was observed with the vehicle at depths of more than two thousand fathoms. Moreover, because of its balanced design, the vehicle remained in a horizontal attitude over a wide range of speeds, as substantiated by an analysis of the echo signals detected thereby.

Obviously many modifications and variations of the present invention are possible in the light of the above teachings. It is therefore to be understood that within the scope of the appended claims the invention may be practiced otherwise than as specifically described.

What is claimed is:
1. A towed vehicle for maintaining sonic apparatus in a predetermined attitude comprising, in combination,
   a generally "teardrop" shaped housing consisting of upper and lower symmetrical half shell sections;
   said housing having an elliptical cross-sectional shape at its point of maximum width and a circular cross-sectional shape at its rear portion;
   a longitudinal slot cut in said upper half section along the vertical plane of symmetry thereof;
   a circular aperture formed in said lower half shell section;
   a metallic window covering said aperture;
   a tubular element, one end of said tubular element fitting into the rear portion of said housing;
   and a ring tail secured to the other end of said tubular element.
2. In an arrangement as defined in claim 1,
   a balancing weight positioned within said tubular element adjacent said other end thereof.
3. In an arrangement as defined in claim 1,
   a transducer mounting plate positioned within said lower half shell section;
   a sleeve secured to said mounting plate;
   said sleeve being concentric with the longitudinal axis of said tubular element;
   and means for securing said one end of said tubular element and said rear portion of said enclosure to said sleeve.
4. In an arrangement as defined in claim 3,
   tow point means secured to said mounting plate;
   said means being opposite said longitudinal slot whereby a link of a towing chain can pass through said slot and be secured to said tow point means.

References Cited in the file of this patent
UNITED STATES PATENTS

| | | |
|---|---|---|
| 3,005,973 | Kietz | Oct. 24, 1961 |
| 3,007,410 | Blacker | Nov. 7, 1961 |
| 3,062,171 | Somerville | Nov. 6, 1962 |
| 3,086,491 | Rather | Apr. 23, 1963 |